United States Patent

[11] 3,553,504

[72] Inventors Gerhard Balcke
Neustadt;
Hans Reichelt, Stuttgart, Germany
[21] Appl. No. 786,933
[22] Filed Dec. 26, 1968
[45] Patented Jan. 5, 1971
[73] Assignee Robert Bosch GmbH
Stuttgart, Germany
a Limited Liability company of Germany
[32] Priority Feb. 10, 1968
[33] Germany
[31] No. 1,613,982

[54] ENCAPSULATED BRUSH HOLDER AND SEMI-
CONDUCTOR VOLTAGE REGULATOR UNIT FOR
AUTOMOTIVE-TYPE ALTERNATOR
3 Claims, 1 Drawing Fig.
[52] U.S. Cl. .................................................. 310/68,
310/239, 310/248
[51] Int. Cl. .................................................. H02k 11/00

[50] Field of Search .......................................... 310/68,
68.4, 239, 71, 159, 168; 29/43; 264/272; 322/33, 28

[56] References Cited
UNITED STATES PATENTS
| 2,983,964 | 5/1961 | Vocht | 264/272 |
| 3,274,320 | 9/1966 | Reber | 264/272 |
| 3,361,915 | 1/1968 | Baker | 310/68 |
| 3,378,708 | 4/1968 | Baker | 310/68 |
| 3,422,339 | 1/1969 | Baker | 310/68 |
| 3,439,255 | 4/1969 | Carnes | 322/28 |

Primary Examiner—Milton O. Hirshfield
Assistant Examiner—R. Skudy
Attorney—Flynn and Frishauf ABSTRACT: A brush holder section and voltage regulator section are combined as a single molding of plastic or the like, the voltage regulator section including an encapsulated semiconductor voltage regulator circuit, backed against the molding forming the brush holder, to form a single unitary integral assembly, for incorporation as a unit adjacent the slip rings of an alternator.

PATENTED JAN 5 1971　　3,553,504
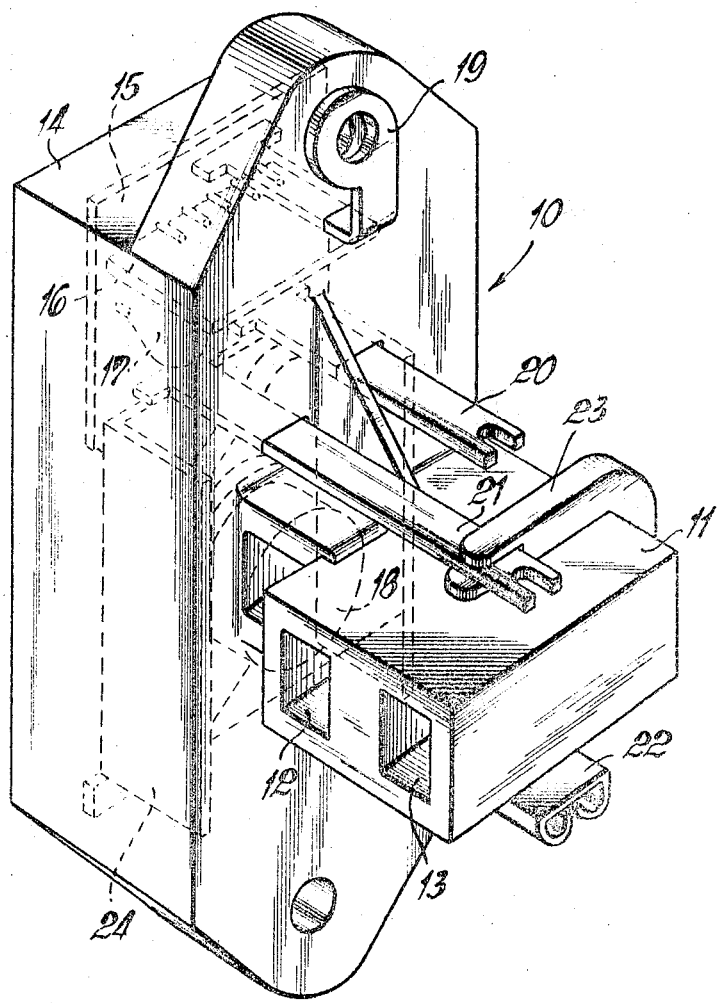
INVENTORS
Gerhard BALCKE
Hans REICHELT
their ATTORNEY

ENCAPSULATED BRUSH HOLDER AND SEMI-CONDUCTOR VOLTAGE REGULATOR UNIT FOR AUTOMOTIVE-TYPE ALTERNATOR

The present invention relates to an integrally molded semiconductor voltage regulator-brush holder combination, the brush holder being arranged to hold the brushes which supply exciter current to the field of an automotive-type alternator, and in one aspect to a method of its manufacture.

It has previously been proposed (see Austrian Patent 246,275, assigned to the assignee of the present invention) to form a voltage regulator and brush holder as a single structural element, in such a way that the electrical circuit components of the voltage regulator are partly within, partly upon a molding form, united to the brush holder.

It is object of the present invention to provide an integrated brush holder–semiconductor voltage regulator assembly which is compact, reliable, and capable of being completely encapsulated so as to be sealed from contamination.

SUBJECT MATTER OF THE PRESENT INVENTION

Briefly, the voltage regulator is a semiconductor voltage regulator assembly, completely encapsulated with a plastic, and joined to a molding of the brush holder assembly to form therewith an integral inseparable unitary element. The material for encapsulation, as well as the material for the brush holder may be of the same type but, if not, must be compatible. If brush holder and voltage regulator elements are made separately, they can be fused together; in accordance with a different method of manufacture, one unit already premolded is fused to the other as the other is being molded. The particular construction will depend in part on the number of units to be made, operating temperature of the brushes, and the tolerance for temperature, during encapsulation, of the electrical elements of the voltage regulator unit.

The structure, organization, and operation of the invention will now be described more specifically with reference to the accompanying drawing, wherein the single FIG. is a perspective, partly phantom view of an embodiment of the present invention.

A molded part 10 has a front part forming a brush holder section 11, having a pair of brush guide holes 12, to receive and guide brushes (not shown). The voltage regulator section 14 is located at the rear of the brush holder section 11. The electronic parts of the voltage regulator itself are not shown in detail, but indicated in broken lines; the arrangement of these parts themselves does not form the subject matter of the present invention and is well known. The electronic parts are completely encapsulated by plastic material. For a detail view of one form of voltage regulator section, reference is made to our copending application entitled "Combined Voltage Regulator Brush Holder Unit for Automotive-Type Alternator," Ser. No. 786,920, Now U.S. Pat. No. 3,476,394, filed Dec. 26, 1968.

The elements of the voltage regulator are arranged on a plate 15, on which the various conductors are located, for example in form of a printed circuit. The printed circuit conductors are connected to pins secured to a resistance carrier 16, a condenser 17, connections of a transistor housing 18, three terminal lugs 19, 20, 21, a terminal connector 22, internally conductively connected to terminal lug 20, as well as with three diodes located on the bottom side of resistance plate 16. Terminal lugs 19, 20, 21, and connector 22 extend out of the plastic encapsulation material of the voltage regulator section. Lug 19 is bent over, has an opening punched therethrough and matches a hole in the plastic encapsulation material which can be used to attach the entire unit to an alternator, providing simultaneously for mechanical as well as for electrical connection. Lugs 20 and 21 are connecting elements for the pigtails of the brushes. Lug 21 additionally is secured to a holding element 23, for example by contact pressure. Connector 22 is a connection unit to which a current supply conductor can be secured.

A group of several transistor units can be enclosed within transistor housing 18; the transistor housing 18, itself, is secured to a heat sink 24, having a generally U-shaped cross section.

The unit can be manufactured, for example, by first making the brush holder section 11 as a separate molding, for example as an injection molding, then assembling the finished molding 11 with the electrical elements, and terminal lugs in a jig, or in a die, and encapsulating the entire unit so that a single unitary seamless part will result. As an alternative, the completely assembled electronic elements, together with base plate 15 can be placed into a die, whereupon plastic encapsulating material is injected around the electronic elements which will at the same time form (mold) the brush holder section. It is possible to utilize different thermoplastic materials for the two sections, for example a very thin flowing material to encapsulate the electrical elements, in order to obtain complete and reliable penetration of all voids by the plastic material. The material of the brush holder section will thus fuse to the material of the voltage regulator section to again provide a single unitary, integral unit.

The entire unit can, of course, also be cast in one step, with the electronic components maintained in position in the mold by spacers.

We claim:

1. Integral brush holder and semiconductor voltage regulator unit for use with alternators having a rotating field comprising:
 a voltage regulator section (14) having a semiconductor voltage regulator circuit;
 insulating material totally encapsulating said voltage regulator circuit and forming an outer housing of said circuit;
 a brush holder section (11) formed of said insulating material and molded integrally with said outer housing of said voltage regulator circuit, said brush holder section (11) and said voltage regulator section (14) forming an inseparable integral brush holder—encapsulated voltage regulator unit (10); and
 terminals extending from said voltage regulator circuit, said terminals extending through said insulating material, at least one of said terminals being located with respect to said brush holder section to be directly connectable to a brush held by said brush holder.

2. Unit according to claim 1 wherein two of said terminals extend through said insulating material, said two terminals being located to be directly connectable to two respective brushes held by said brush holder.

3. Unit according to claim 1 wherein said brush holder section is a preformed molded unit fused to said insulating material encapsulating said voltage regulator circuit during the molding of said voltage regulator section, thereby forming said inseparable integral brush holder—encapsulated voltage regulator unit.